US010012304B2

(12) United States Patent
Messier (10) Patent No.: US 10,012,304 B2
(45) Date of Patent: Jul. 3, 2018

(54) CONTINUOUSLY VARIABLE TRANSMISSION PROVIDED WITH A GEROTOR PUMP

(71) Applicant: TRANSMISSION CVT CORP INC., Sainte-Julie (CA)

(72) Inventor: Francois Messier, Varennes (CA)

(73) Assignee: TRANSMISSION CVTCORP INC., Sainte-Julie, Quebec (CA)

( * ) Notice: Subject to any disclaimer, the term of this patent is extended or adjusted under 35 U.S.C. 154(b) by 710 days.

(21) Appl. No.: 14/271,032

(22) Filed: May 6, 2014

(65) Prior Publication Data

US 2014/0334958 A1      Nov. 13, 2014

Related U.S. Application Data

(60) Provisional application No. 61/820,221, filed on May 7, 2013.

(51) Int. Cl.
| | | |
|---|---|---|
| *F04C 15/00* | (2006.01) | |
| *F04C 2/10* | (2006.01) | |
| *F04C 15/06* | (2006.01) | |
| *F16H 57/04* | (2010.01) | |

(52) U.S. Cl.
CPC ......... *F16H 57/0436* (2013.01); *F04C 2/102* (2013.01); *F04C 15/06* (2013.01); *F16H 57/049* (2013.01)

(58) Field of Classification Search
CPC .............. F16H 57/0436; F16H 57/049; F16H 57/0434; F16H 15/28; F16H 15/40; F16H 15/503; F16H 3/095; F16H 57/0441; F16H 57/0483; F16H 57/0493; F16H 61/0025; F16H 61/662; F16H 61/66272; F16H 39/22; F16H 39/26; F16H 39/28; F16H 37/084; F16H 37/0853; F16H 37/086; F04C 2/102; F04C 15/06; F04C 11/001; F04C 14/26; F04C 15/0061; F04C 2270/56; F04C 15/008; F02M 41/06; F02M 41/063; F02M 41/066
USPC .............................. 475/185; 123/450, 198 C
See application file for complete search history.

(56) References Cited

U.S. PATENT DOCUMENTS

| | | | |
|---|---|---|---|
| 3,581,587 A | 6/1971 | Dickenbrock | |
| 3,802,284 A | 4/1974 | Sharpe | |
| 5,302,158 A | 4/1994 | Kwasniewski | |
| 5,544,540 A | 8/1996 | Holman | |
| 5,976,049 A * | 11/1999 | Yoshida | F16H 3/60 |
| | | | 475/185 |
| 6,386,836 B1 | 5/2002 | Johnson | |

(Continued)

FOREIGN PATENT DOCUMENTS

| | | |
|---|---|---|
| CN | 101788052 | 7/2010 |
| EP | 2163764 | 3/2010 |

(Continued)

*Primary Examiner* — Devon Kramer
*Assistant Examiner* — Thomas Cash
(74) *Attorney, Agent, or Firm* — Fay Kaplun & Marcin, LLP (57) ABSTRACT

A continuously variable transmission (CVT) provided with an integrated gerotor pump that also acts as a rotation blocker is described herein. In one illustrated embodiment, the gerotor pump is used to pump lubrication and cooling fluid through a radiator and into the hollow shaft of the CVT.

10 Claims, 12 Drawing Sheets

(56) References Cited

U.S. PATENT DOCUMENTS

| | | | |
|---|---|---|---|
| 6,709,245 B2* | 3/2004 | Bachmann | F16N 13/20 |
| | | | 415/110 |
| 2003/0091453 A1 | 5/2003 | Lambert et al. | |
| 2004/0093149 A1* | 5/2004 | Hara | B60H 1/00885 |
| | | | 701/104 |
| 2011/0113782 A1 | 1/2011 | Stiesdal | |
| 2011/0218072 A1* | 9/2011 | Lohr | F16H 15/28 |
| | | | 475/185 |
| 2011/0298314 A1 | 12/2011 | Atarashi et al. | |
| 2012/0279699 A1* | 11/2012 | Kim | F01P 11/08 |
| | | | 165/287 |

FOREIGN PATENT DOCUMENTS

| | | |
|---|---|---|
| JP | S46-24753 | 8/1971 |
| JP | H10-176748 | 6/1998 |
| JP | 2011-259590 | 12/2011 |

\* cited by examiner

CONTINUOUSLY VARIABLE TRANSMISSION PROVIDED WITH A GEROTOR PUMP

FIELD

The present disclosure generally relates to Continuously Variable Transmissions (CVT). More specifically, the present disclosure is concerned with a toroidal CVT having an integrated gerotor pump.

BACKGROUND

Toroidal Continuously Variable Transmissions (hereinafter generically referred to as "CVT") are believed known in the art. The operation of such a CVT will therefore only be briefly discussed herein.

Generally stated, a toroidal CVT is provided with a drive disk having a toroidal surface, a driven disk also having a toroidal surface, both disks being linked by rollers in contact with their respective toroidal surfaces. The angle of the rollers with respect to the drive and driven disks dictates the speed ratio between the driven and drive disks.

Often, toroidal CVTs are designed according to the so-called "dual cavity" configuration including two drive disks and a single driven disk having opposed toroidal surfaces and located between the two drive disks. When this is the case, one of the output and input of the CVT is provided about in the middle of the device.

Toroidal CVTs generally require lubrication and cooling, often provided by the same fluid medium that is pumped in the CVT through a radiator or other cooling and storing elements.

DETAILED DESCRIPTION

An object is generally to provide an improved CVT. More specifically, an object is to provide a CVT having an integrated gerotor pump.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that the expression "prime mover" is to be construed herein and in the appended claims as an internal combustion engine a turbine engine, or any other mechanical power production element or assembly.

It is to be noted that while the expression "Toroidal CVT", standing for Continuously Variable Transmission is to be construed herein and in the appended claims to describe a dual-cavity full toroidal CVT, this expression is to be construed herein and in the appended claims as any type of toroidal CVT such as, for example, half-toroidal CVT and single cavity toroidal CVT.

Other objects, advantages and features of the continuously variable transmission provided with a gerotor pump will become more apparent upon reading of the following non-restrictive description of illustrative embodiments thereof, given by way of example only with reference to the accompanying drawings.

More specifically, in accordance with an illustrative embodiment, there is provided a CVT comprising a shaft rotatable within a non-rotating sleeve, a casing, a rotation blocker/pump assembly interconnecting the non-rotating sleeve and the casing. The rotation blocker/pump assembly having a central hub mounted to the non-rotating sleeve, an intake arm, a send arm and a return arm mounted between the casing and the central hub; and a gerotor pump associated with the central hub, the gerotor pump having an intake and an outlet. The gerotor pump having an inner rotor mounted to the shaft and an outer rotor meshed with the inner rotor. Whereby a) rotation of the shaft causes rotation of the inner and outer rotors of the gerotor pump to thereby cause a pumping action between the intake and outlet of the gerotor pump and b) rotation of the non-rotating sleeve is prevented by the interconnection of the sleeve to the casing through the rotation blocker/pump assembly.

According to another aspect, there is provided a rotation blocker/pump assembly to be used in a CVT to both prevent rotation of a non-rotating sleeve by connecting the sleeve to a casing of the CVT and to pump fluid present in the casing, the CVT including a shaft rotatable within the non-rotating sleeve. The assembly comprising a central hub mounted to the non-rotating sleeve, an intake arm, a send arm and a return arm mounted between the casing and the central hub and a gerotor pump associated with the central hub, the gerotor pump having an intake and an outlet. The gerotor pump having an inner rotor mounted to the shaft and an outer rotor meshed with the inner rotor. Whereby a) rotation of the shaft causes rotation of the inner and outer rotors of the gerotor pump to thereby cause a pumping action between the intake and outlet of the gerotor pump and b) rotation of the non-rotating sleeve is prevented by the interconnection of the sleeve to the casing through the rotation blocker/pump assembly.

Generally stated, illustrative embodiments described herein are concerned with a toroidal CVT provided with a gerotor pump/rotation blocker assembly integrated therewith. In the illustrative embodiments, the gerotor pump is used to pump fluid, such as lubrication and cooling fluid, through a radiator and into the hollow shaft of the CVT.

Figure 1:
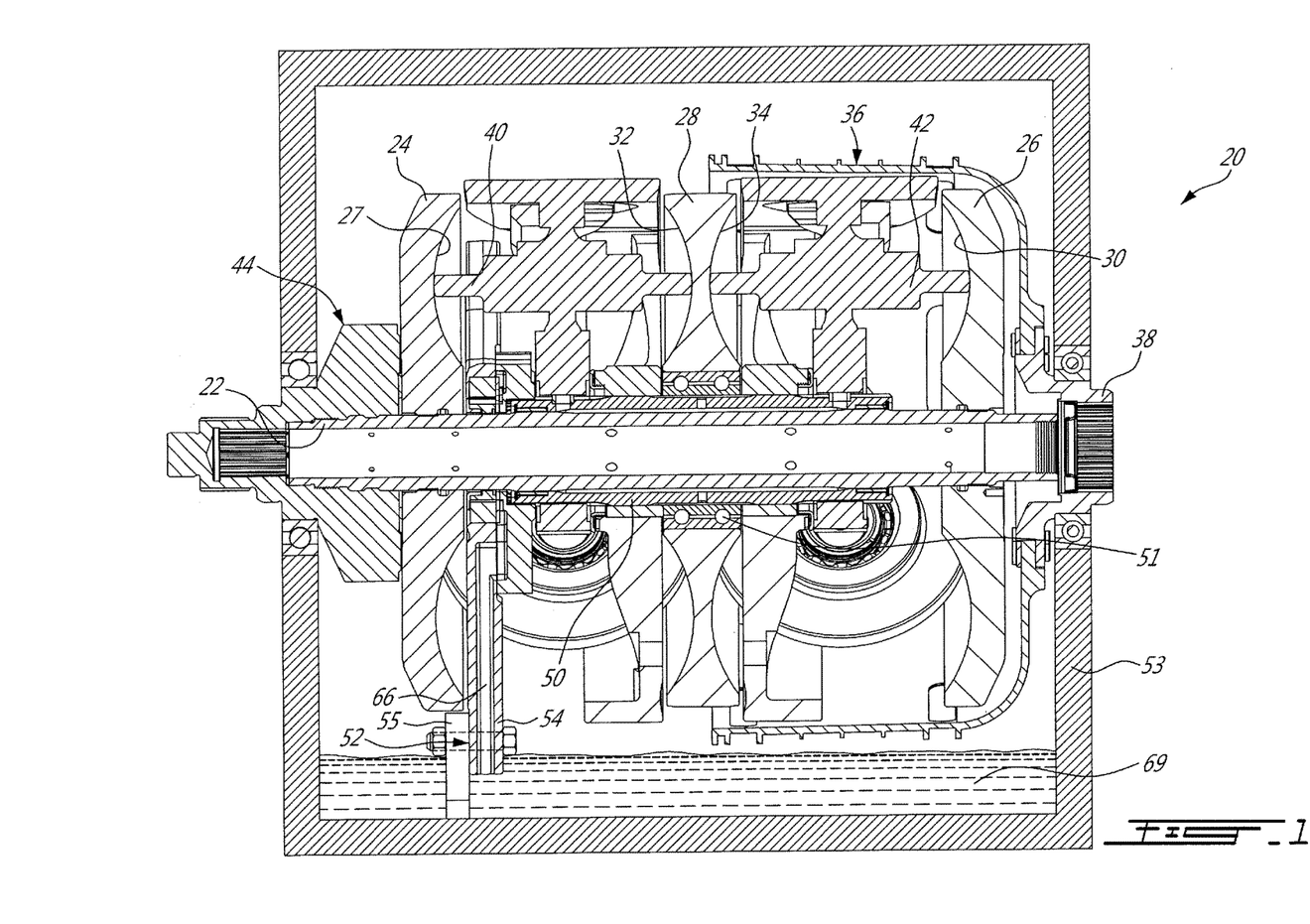
FIG. 1 is a sectional view of a dual cavity CVT provided with a gerotor pump according to an illustrative embodiment.

As shown in FIG. 1, a toroidal continuously variable transmission 20 according to a first illustrative embodiment that includes a hollow input shaft 22 for receiving power from a prime mover (not shown), two driving disks 24, 26 provided with respective toroidal surfaces 27, 30, a driven disk 28 provided with two opposite toroidal surfaces 32, 34 respectively facing the toroidal surfaces 27 and 30 and a drum assembly 36 including an output shaft 38 transmitting the variable speed power output.

Positioned between the driving disks 24 and 26 and the driven disk 28 are drive rollers 40, 42 that are suitable for transferring rotational motion from the driving disks 24 and 26 to the driven disk 28. More specifically, the drive rollers 40, 42 rotate between the toroidal surfaces of the driving disks 24, 26 and the driven disk 28, such that by changing the angle of the drive rollers 40, 42 in relation to the driving disks 24, 26 and the driven disks 28, there is a ratio change between the speed of rotation of the driving disks 24, 26 and the speed of rotation of the driven disk 28, thereby providing a continuously variable transmission.

The hollow driving shaft 22 is fixedly connected to the driving disks 26 and to a tension applying mechanism 44 that is positioned next to the driving disk 24 to exert a compression force on the driving disk 24.

As the driving disks 24 and 26 rotate, they cause the drive rollers 40, 42 to rotate, which in turn causes the driven disk 28 to rotate. The driven disk 28 rotates about the same axis as the driving disks 24, 26 and the driving shaft 22.

The driven disk 28 is rotatably mounted to a non-rotating sleeve 50 via bearings 51. The sleeve 50 is so mounted to the hollow shaft 22 that the shaft can rotate therein. The sleeve 50 is prevented from rotating by the rotation blocker/gerotor pump assembly 52 (hereinafter referred to as the pump assembly 52) fixedly connecting the sleeve 50 to the casing 53 of the CVT 20.

Figure 2:
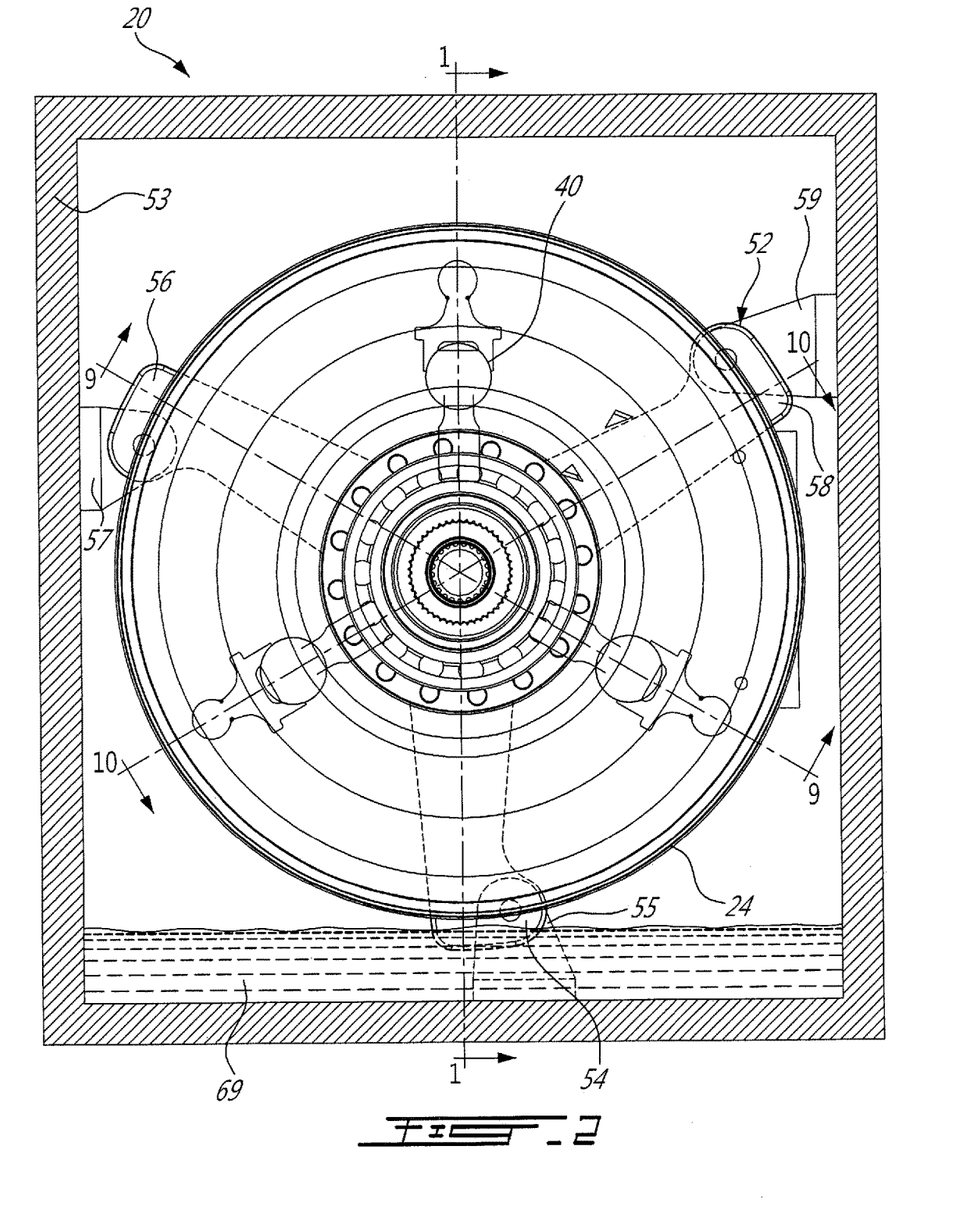
FIG. 2 is an side elevation view of the CVT of FIG. 1.

Turning now to FIG. 2 of the appended drawings, which illustrates an end view of the CVT of FIG. 1. As is clear from this figure, the pump assembly 52 has three arms: an intake arm 54, a send arm 58 and a return arm 56 that are separated by 120 degrees. It is also clear that the pump assembly 52 does not interfere with the rollers assemblies 40 (only the mounting knuckles being shown in FIG. 2 for clarity reasons). Other elements including connection tubes between the arms are also omitted from the figures for clarity reasons.

Figure 3:
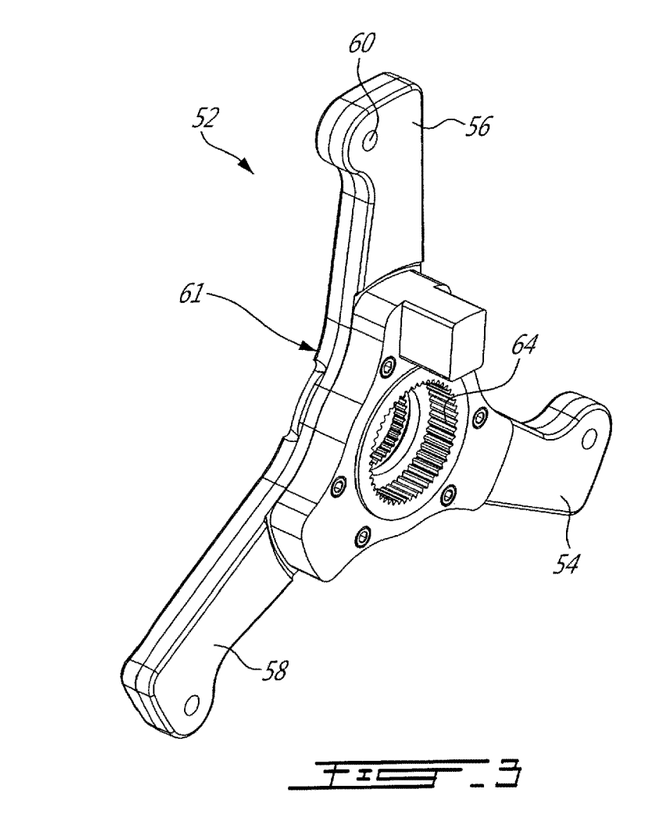
FIG. 3 is a perspective view of the gerotor pump assembly of the CVT of FIG. 1.
Figure 4:
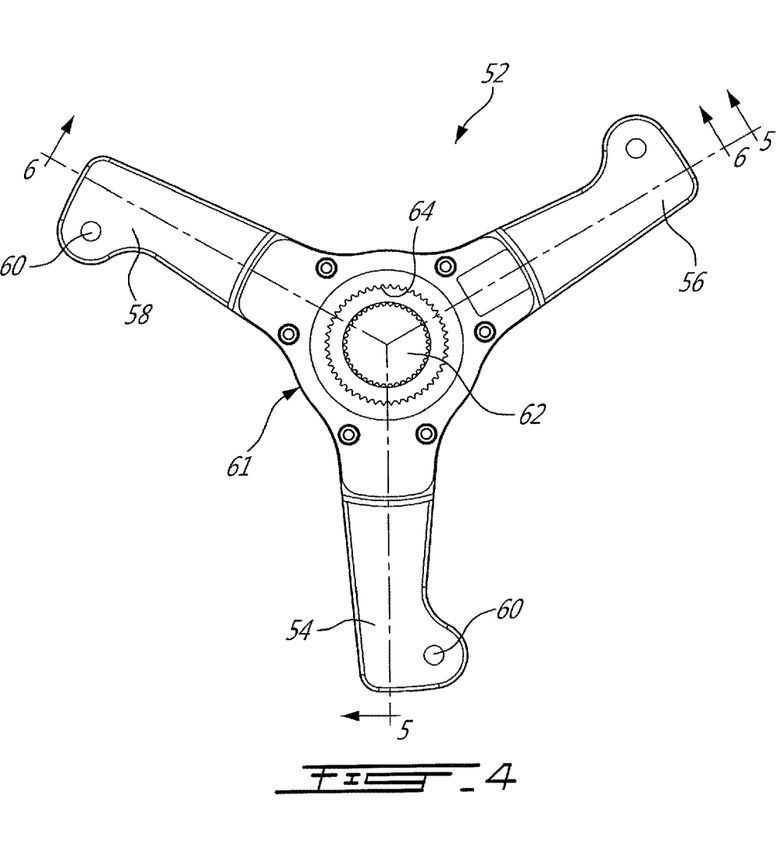
FIG. 4 is a front elevation view of the gerotor pump assembly of FIG. 3.

The pump assembly 52 is better shown in FIGS. 3 and 4. As can be seen from these figures, the three arms 54, 56 and 58 are associated with a central hub 61 and are provided with free ends that include mounting apertures 60 allowing them to be mounted to respective brackets 55, 57 and 59 of the casing 53 of the CVT 20 (see FIG. 2) via fasteners.

The pump assembly 52 includes a central aperture 62, provided in the hub 61, allowing the hollow shaft 22 to pass through. The central aperture 62 is stepped and includes a larger diameter 64 that is splined. This splined larger diameter step is configured to fixedly connect to the non-rotating sleeve 50 of the CVT. Accordingly, when the pump assembly 52 is mounted to the casing 53 via fasteners inserted through the apertures 60 of the arms and mounted to the sleeve 50 via the splined aperture 64, the sleeve 50 is prevented from rotating. The pump assembly 52 therefore performs its rotation blocker function.

Figure 5:
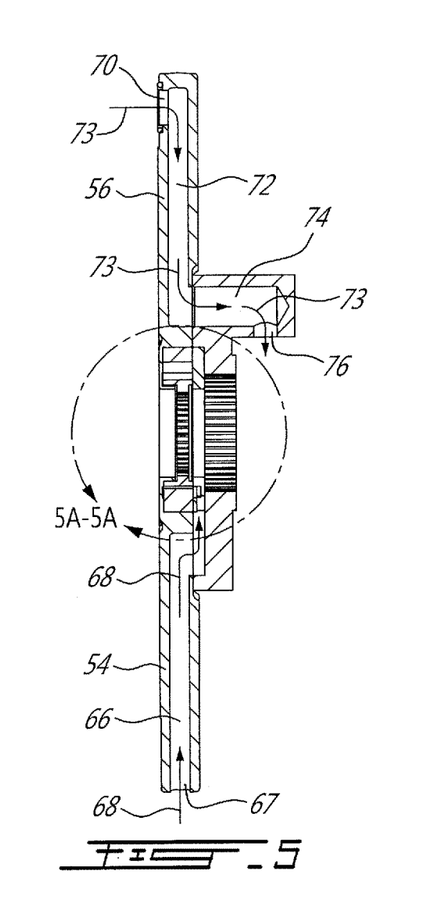
FIG. 5 is a sectional view taken along line 5-5 of FIG. 4.

The various features of the intake and return arms 54 and 56 can be appreciated from FIG. 5. As can be seen from this sectional figure, the intake arm 54 includes an intake conduit 66 having an intake aperture 67 through which lubrication fluid can be drawn (see arrow 68). It is to be noted that the intake aperture 67 is provided on or near the end of the arm 54 and that the intake arm 54 is positioned downwardly when the CVT 20 is in its operating position. Therefore, the reserve of lubricating fluid 69 that is present at the bottom of the casing 52 of the CVT 20 (see FIGS. 1 and 2) may be pumped.

The intake arm 54 shown in its operating position while the pump assembly 52 is mounted to the CVT 20 may be seen in FIG. 1.

The return arm 56 has a return inlet 70 leading to a conduit 72. The conduit 72 is linked to a return chamber 74 having a bottom aperture 76 in fluid communication with the hollow shaft 22 to thereby return the lubricating fluid thereto. Arrows 73 illustrates the flow path of the returning lubricating fluid.

Figure 10:
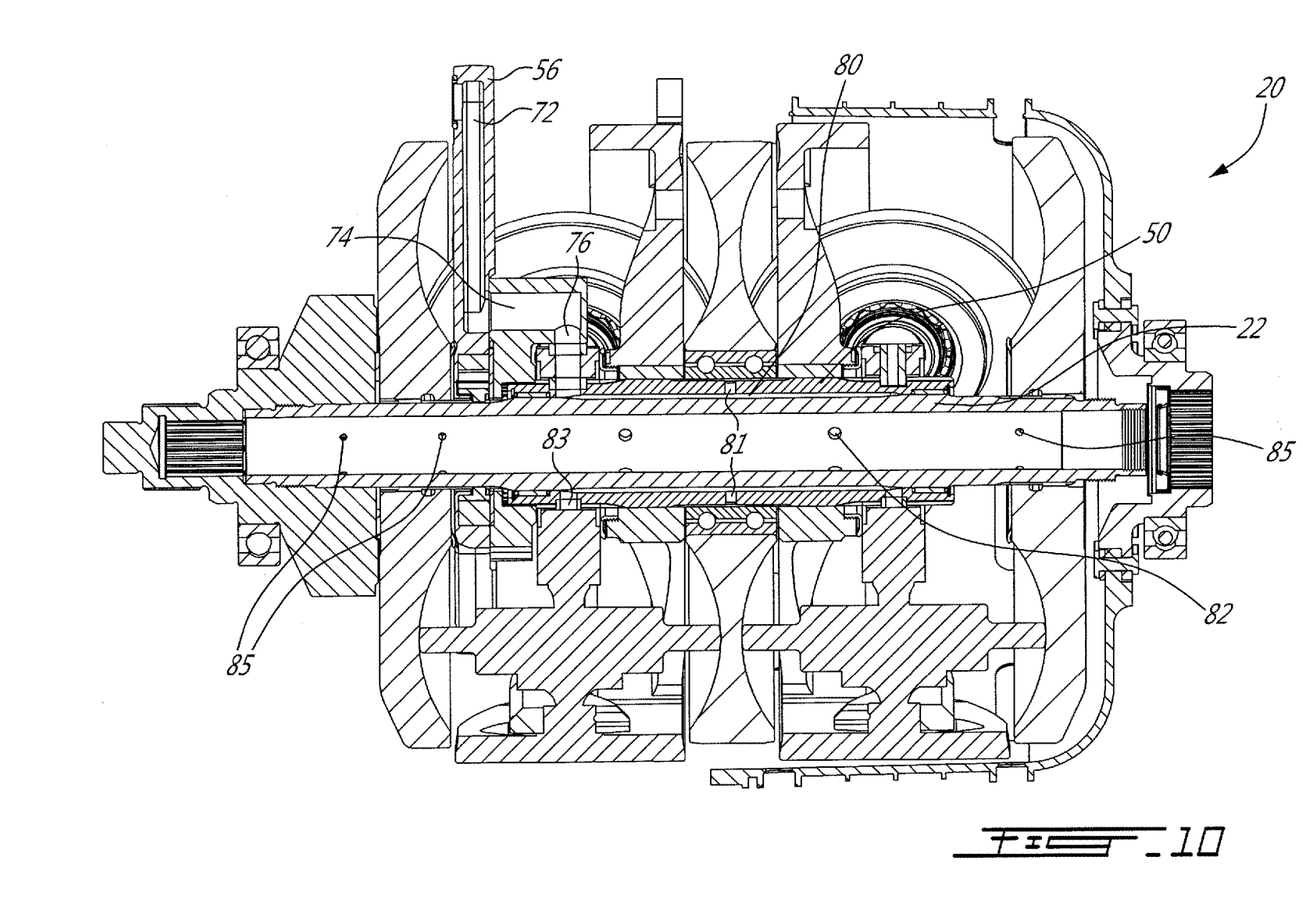
FIG. 10 is a sectional view taken along line 10-10 of FIG. 2.

FIG. 10 of the appended drawings illustrates the return arm 56 when the pump assembly 52 is mounted to the CVT 20. As can be seen from this figure, the aperture 76 is in fluid communication with a space between the sleeve 50 and the hollow shaft 22 defining a manifold 80. Accordingly, a portion of the lubrication fluid returned to this manifold 80 will be transferred to the hollow shaft via apertures 82. Another portion of the lubrication fluid will be supplied to other parts of the CVT 20, for example via fluid distribution apertures 81 and 83 of the sleeve 50. The hollow shaft 22 also includes other fluid distribution apertures 85 to distribute lubrication fluid to other parts of the CVT.

Figure 6:
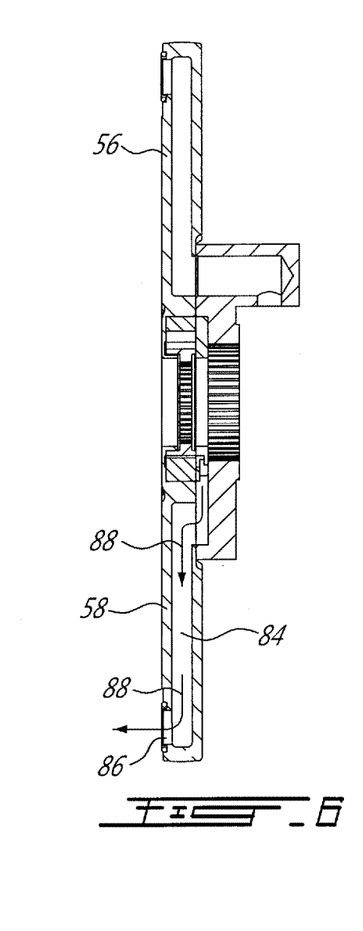
FIG. 6 is a sectional view taken along line 6-6 of FIG. 4.

FIG. 6 illustrates the send arm 58 including a send conduit 84 having an outlet 86. Arrows 88 illustrate the flow of fluid sent from the pump assembly 52. Tubes (not shown) connect the outlet 86 of the pump assembly 52 to external elements. For example a radiator (not shown) that cools the lubricating fluid could be such an element. An outlet of the radiator would be connected to the return inlet 70 of the return arm 56, for example.

One skilled in the art will understand that should external elements be unnecessary, the outlet 86 could be directly connected to the inlet 70 via a tube (not shown).

Figure 9:
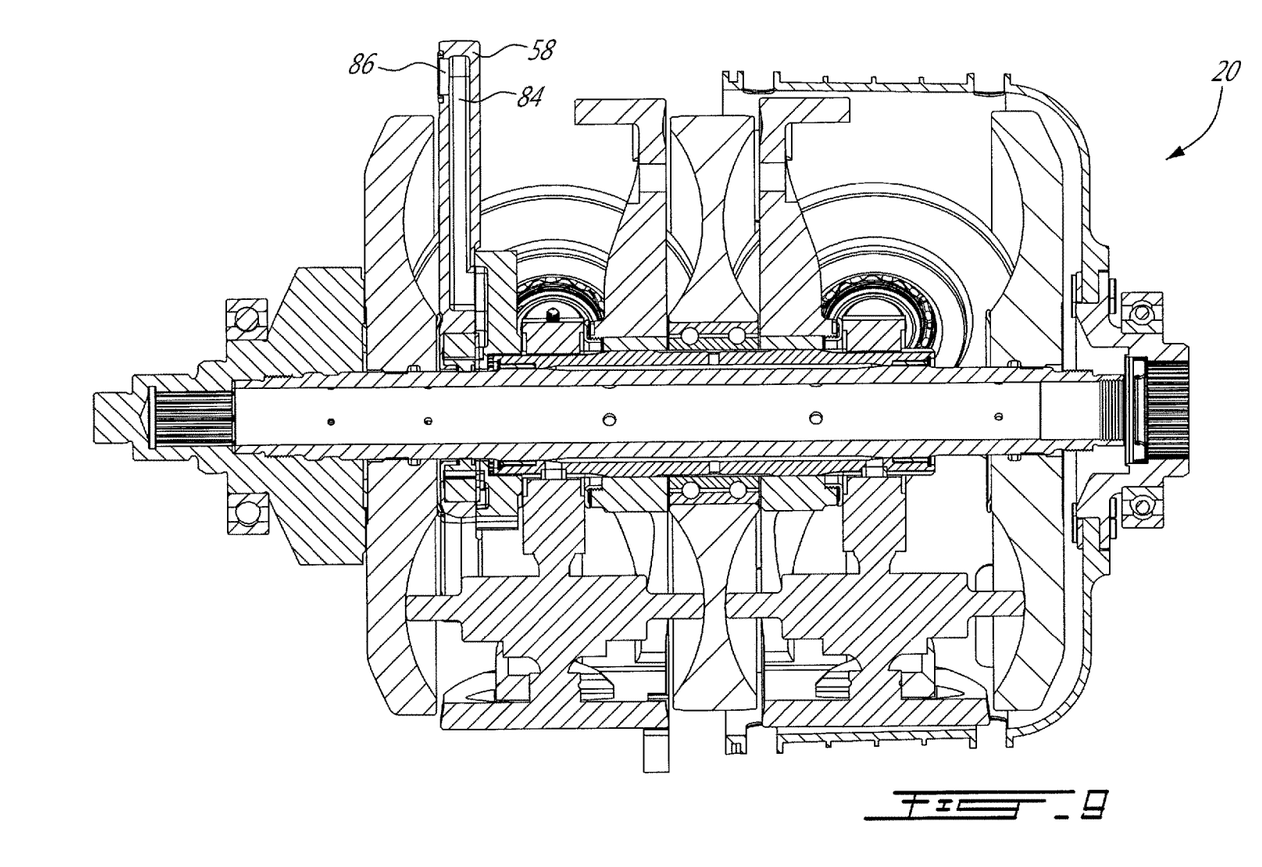
FIG. 9 is a sectional view taken along line 9-9 of FIG. 2.

FIG. 9 illustrates the send arm 58 while the pump assembly 52 is mounted to the CVT 20.

Figure 5A:
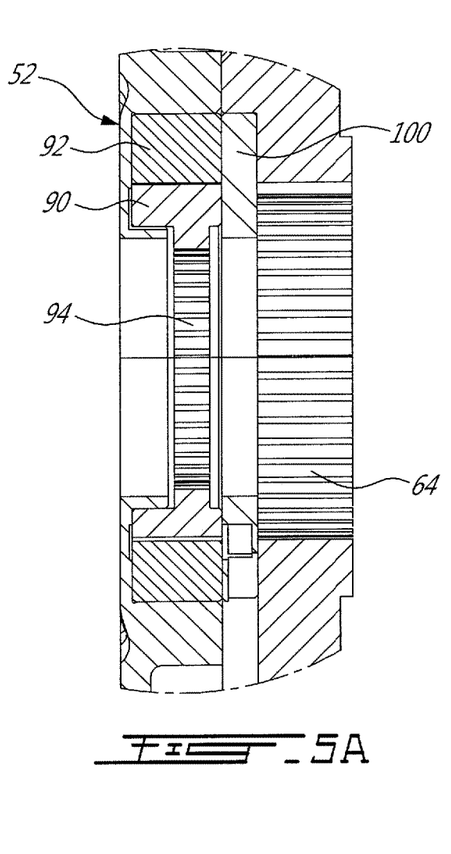
FIG. 5A is an enlarged view of a portion of FIG. 5.
Figure 7:
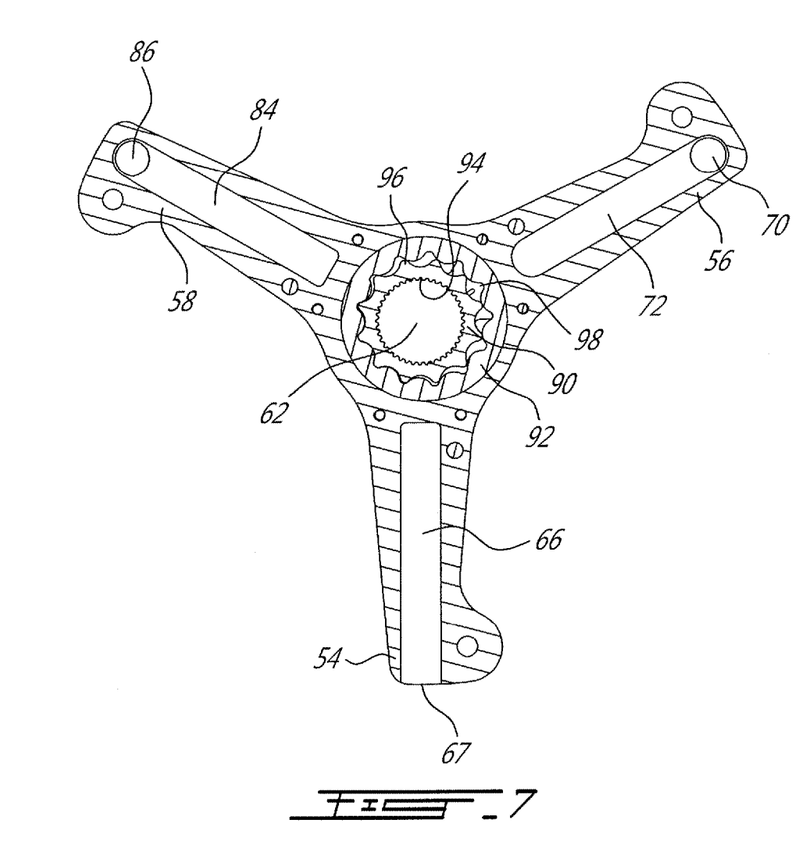
FIG. 7 is a sectional view of the pump of FIG. 4.

Turning now to FIGS. 7 and 5A, which are sectional views of the pump assembly, the operation of the pump assembly 52 will be described. The pump assembly 52 includes a first inner rotor 90 and a second outer rotor 92.

The inner rotor 90 includes the central opening 62 of the pump 52 and has a splined wall 94 allowing the inner rotor to be mounted to a splined portion of the hollow shaft 22 for rotation therewith. In the illustrative embodiment of FIG. 7, the inner rotor has twelve outer teeth 96 partially meshed with thirteen inner teeth 98 of the outer rotor 92, which is free to rotate. Of course, one skilled in the art will understand that the number of teeth of each rotor depends on the required flow of fluid, amongst other. One skilled in the art is therefore believed to be in a position to design the two rotors according to the pump requirements. Furthermore, other mechanical means may be used to connect the inner rotor 90 to the hollow shaft 22 instead of the splined wall 94.

Figure 8:
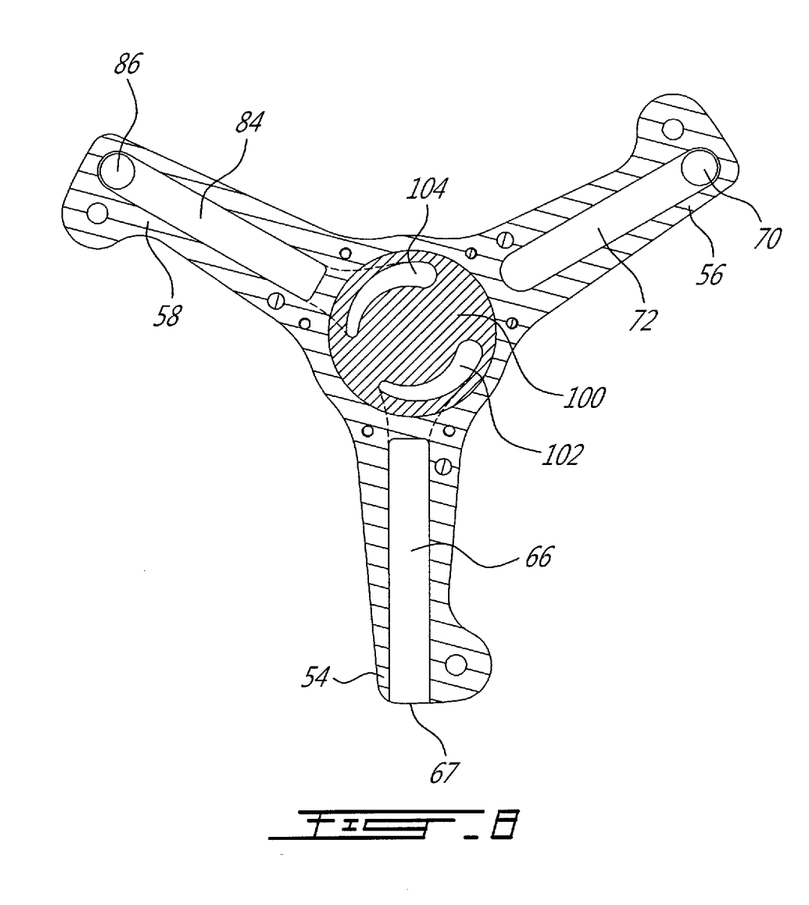
FIG. 8 is a sectional view similar to FIG. 7 where the first and second rotors are removed.

Turning now to FIG. 8 of the appended drawings, which is similar to FIG. 7 but where the two rotors 90 and 92 have been removed to illustrate the port plate 100 provided with an intake port 102 in fluid connection with the intake conduit 66 and a send port 104 in fluid connection with the send conduit 84.

Accordingly, as will easily be understood by one skilled in the art, rotation of the two rotors 90 and 92 create a vacuum drawing fluid from the intake arm 54 though the intake port 102 and a compression expelling fluid from the send arm 58 through the send port 104. One skilled in the art will be in a position to design the rotors 90 and 92 according to the flow of fluid required and the speed range of the rotation of the rotors.

One skilled in the art will understand that the features of the port plate 100 could be integrated to the central hub 61 to forego the use of a separate plate.

Figure 11:
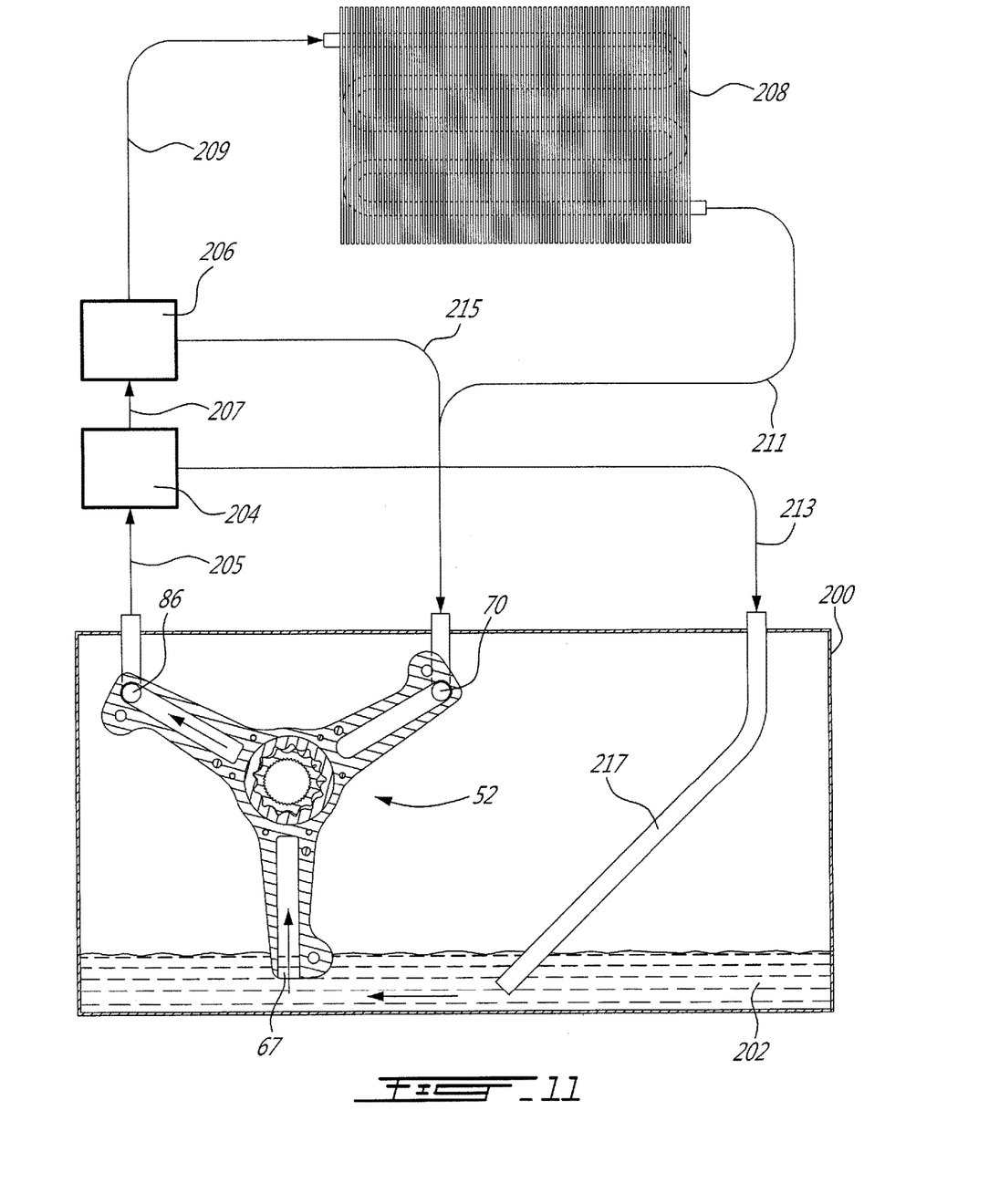
FIG. 11 schematically illustrates a gerotor pump assembly connected to external components.

Turning now to FIG. 11 of the appended drawings, the interconnections of the pump assembly 52 to various external elements according to an illustrative embodiment will be described. It is to be noted that FIG. 11 illustrates one of many possible ways to interconnect the pump assembly 52. It is also to be noted that the pump assembly 52 is schematically shown in FIG. 11 as being in an enclosure 200, having a reserve of fluid 202 and being disconnected from the CVT 20, for clarity purpose.

When the pump assembly 52 is in operation, the pumped fluid flow goes from outlet 86 of the pump assembly 52 to a pressure release valve 204 (arrow 205), to a thermostatic valve 206 (arrow 207) and to a radiator 208 (arrow 209) before returning to the pump assembly via the return inlet 70 (arrow 211).

Accordingly, should pressure build in the lubrication circuit components above a predetermined threshold, the pressure relieve valve 204 returns the pumped fluid to the reservoir (arrow 213. Of course, the tube 217 returning the pumped fluid to the reservoir could optionally be directly connected to the intake arm to therefore create a closed loop that would help when the pumped fluid is cold.

To accelerate the warming of the fluid when the pump assembly 52 is used in a cold environment, the thermostatic valve 206 is used to return the fluid to the return inlet 70 (arrow 215) when the temperature of the fluid is below a predetermined threshold.

One skilled in the art that the valves 204 and/or 206 could be omitted and that the internal components of these valves could be integrated to pump assembly 52.

Turning now to FIGS. 12 to 16 of the appended drawings, a pump assembly 300 according to another illustrative embodiment will be described. Since the pump assembly 300 is very similar to the pump assembly 52 of the previous figures, only the differences therebetween will be described, for concision purpose.

Figure 12:
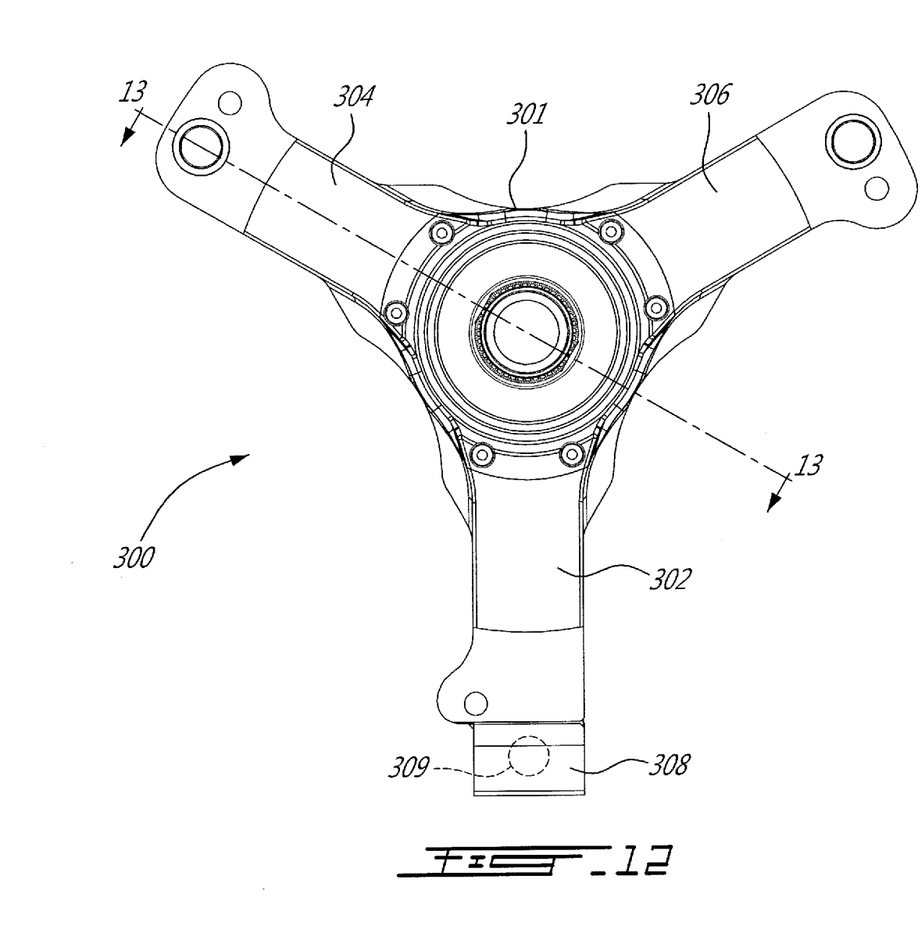
FIG. 12 is a front elevation view of a gerotor pump assembly according to another illustrative embodiment.

As can be seen from FIG. 12, the intake 302, return 304 and send 306 arms are sturdier than the equivalents arms of the pump assembly 52 while still being integral with the hub 301 thereof. The intake arm 302 also includes an extension 308 allowing operation with lower levels of fluid in the bottom of the casing (not shown). Furthermore, the inlet 309 of the intake arm 302 is provided on the side instead of being at the end thereof, again to allow operation with lower levels of fluid in the bottom of the casing (not shown).

Figure 13:
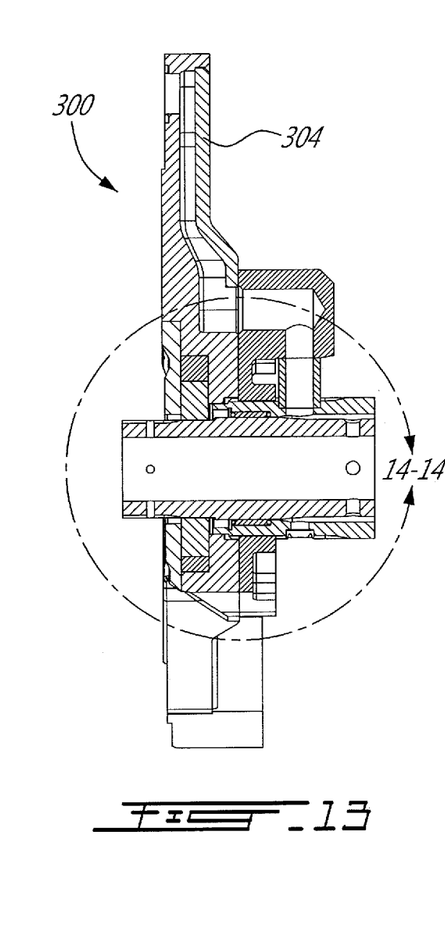
FIG. 13 is a sectional view taken along line 13-13 of FIG. 12.

FIG. 13, which is a sectional view along line 13-13 of FIG. 12, illustrates the interconnection of the return arm 304 and the hollow shaft. As better seen in the enlarged portion shown in FIG. 14, tubing 310 is used to connect the return arm 304 to the space between the sleeve 50 and the shaft 22 defining the manifold 80.

Figure 14:
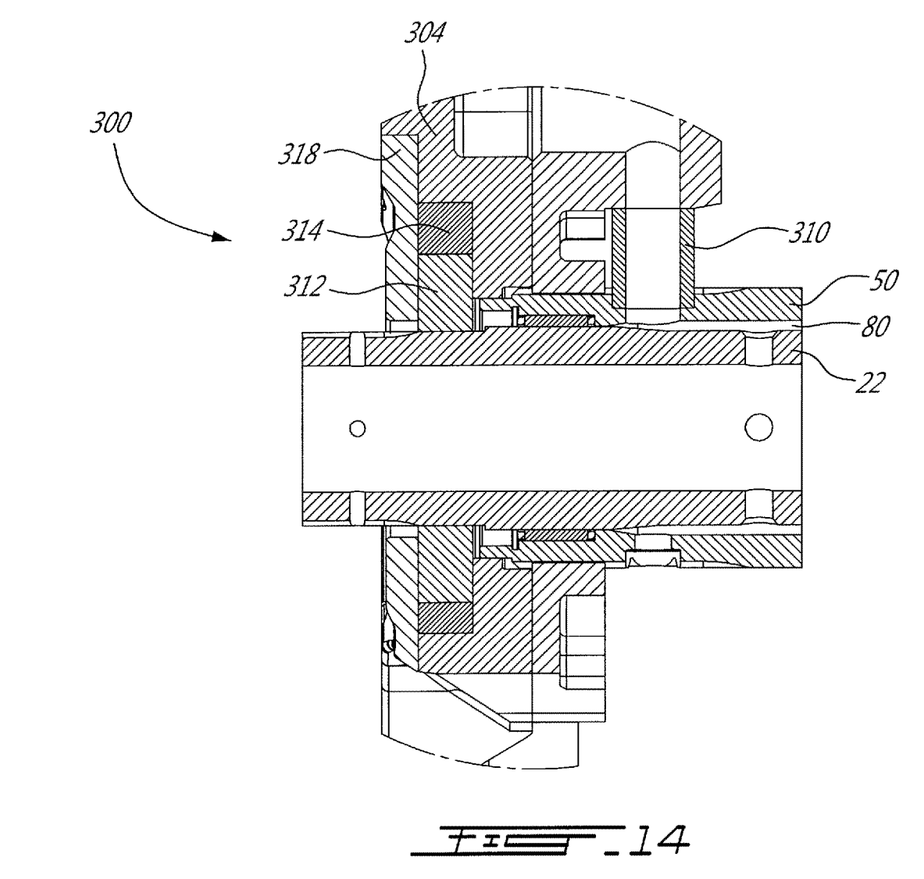
FIG. 14 is an enlarged view of a portion of FIG. 13.
Figure 15:
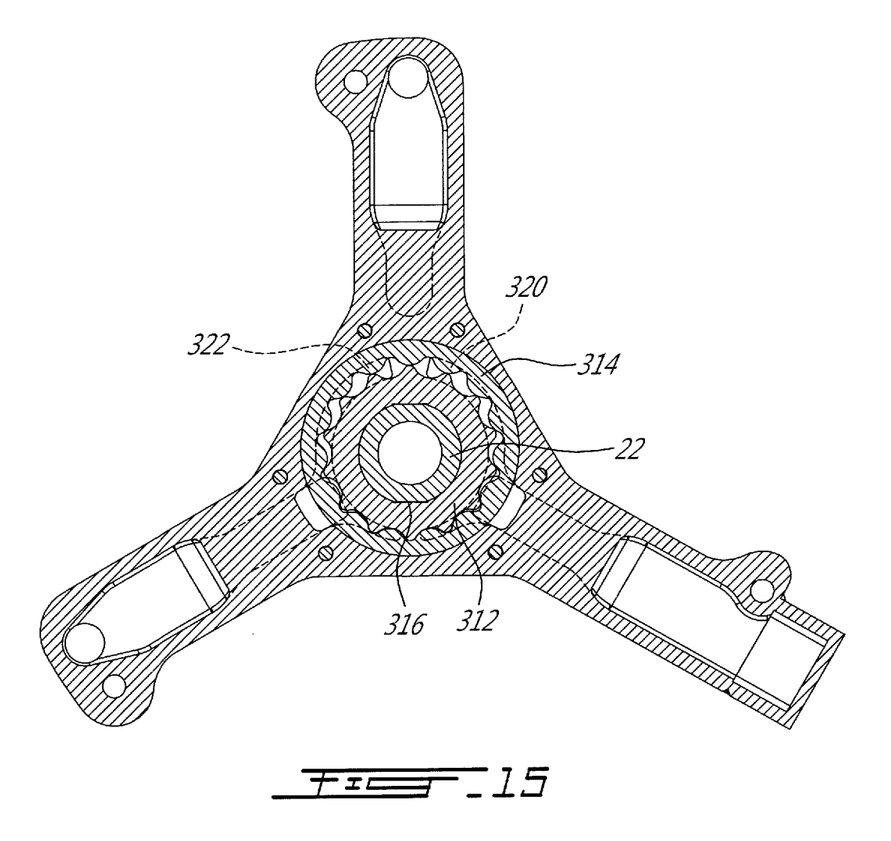
FIG. 15 is a sectional front elevation view of the gerotor pump assembly of FIG. 12.

FIGS. 14 and 15 show the interconnection of the inner and outer rotors 312 and 314. As is apparent from FIG. 15, the shaft 22 is not splined to interconnect with the inner rotor 312 but includes flat sections 316 corresponding to flat sections of the inner rotor 312.

From FIG. 14, the rotors 312 and 314 are maintained in place by a cover 318.

While the hub 301 of the pump assembly 300 includes an intake port 320 in fluid connection with the intake conduit and a send port 322 in fluid connection with the send conduit, these ports are not provided in a separate plate but are machined directly in the hub 301.

One skilled in the art will understand that the operation of the pump assembly 300 is identical to the operation of the pump assembly 52 described hereinabove.

It is to be noted that while the above described rotation blocker/pump assemblies has been described in the context of a toroidal CVT using rollers, other types of CVT could benefit from the use of such an assembly.

One skilled in the art will understand that while the above described rotation blocker/pump assemblies are so designed that the intake, send and return conduits are respectively integrated in the intake, send and return arms, this is not a requirement. Indeed, the conduits could be separate from the arms, for example by providing an intake tube connected to the intake of the gerotor pump and reaching to the bottom of the casing, a send tube connected to the outlet of the gerotor pump and to the optional radiator and a return tube connected to the outlet of the radiator and reaching to the bottom of the casing.

It is to be understood that the continuously variable transmission provided with a gerotor pump is not limited in its application to the details of construction and parts illustrated in the accompanying drawings and described hereinabove. The continuously variable transmission provided with a gerotor pump is capable of other embodiments and of being practiced in various ways. It is also to be understood that the phraseology or terminology used herein is for the purpose of description and not limitation. Hence, although the continuously variable transmission provided with a gerotor pump has been described hereinabove by way of illustrative embodiments thereof, it can be modified, without departing from the spirit, scope and nature thereof.

What is claimed is:

1. A CVT, comprising:
   a hollow shaft rotatable within a non-rotating sleeve;
   a casing;
   a rotation blocker/pump assembly interconnecting the non-rotating sleeve and the casing, the rotation blocker/pump assembly having:
   a central hub mounted to the non-rotating sleeve;
   an intake arm, a send arm and a return arm each having a first end mounted to the casing and a second end mounted to the central hub; the send arm being fluidly connectable to the return arm, the return arm being fluidly connected to the hollow shaft; and
   a gerotor pump associated with the central hub, the gerotor pump having an intake associated with the intake arm and an outlet associated with the send arm; the gerotor pump having an inner rotor mounted to the shaft and an outer rotor meshed with the inner rotor;
   whereby a) rotation of the shaft causes rotation of the inner and outer rotors of the gerotor pump to thereby cause a pumping action between the intake and outlet of the gerotor pump and b) rotation of the non-rotating sleeve is prevented by the interconnection of the sleeve to the casing through the rotation blocker/pump assembly.

2. A CVT as recited in claim 1, wherein the hollow shaft is provided with apertures to distribute the fluid pumped therein.

3. A CVT as recited in claim 1, wherein a manifold is provided between the shaft and the non-rotating sleeve, the hollow shaft being open to the manifold via apertures, the return arm being fluidly connected to the hollow shaft via a connection to the manifold.

4. A CVT as recited in claim 1, wherein the respective second ends of the intake arm, the send arm and the return arm are integral with the central hub.

5. A CVT as recited in claim 1, wherein the first ends are provided with apertures and where the casing is provided with brackets also provided with corresponding apertures allowing fasteners to be used to secure the first ends of the arms to the casing.

6. A CVT, comprising:
a shaft rotatable within a non-rotating sleeve;
a casing;
a rotation blocker/pump assembly interconnecting the non-rotating sleeve and the casing, the rotation blocker/pump assembly having:
 a central hub mounted to the non-rotating sleeve;
 an intake arm, a send arm and a return arm each having a first end mounted to the casing and a second end mounted to the central hub; and
 a gerotor pump associated with the central hub, the gerotor pump having an intake associated with the intake arm and an outlet associated with the send arm; the gerotor pump having an inner rotor mounted to the shaft and an outer rotor meshed with the inner rotor;
wherein a) rotation of the shaft causes rotation of the inner and outer rotors of the gerotor pump to thereby cause a pumping action between the intake and outlet of the gerotor pump and b) rotation of the non-rotating sleeve is prevented by the interconnection of the sleeve to the casing through the rotation blocker/pump assembly,
wherein the casing includes lubricating fluid at least partially in contact with the intake arm,
wherein the CVT further comprising a radiator provided with an input associated with the send arm and an output associated with the return arm, thereby cooling the lubricating fluid pumped therethrough, and
wherein the CVT further comprising a pressure release valve provided between the send arm and the radiator, the pressure release valve being so configured as to return the pumped fluid to the casing should pressure in the radiator increase above a limit.

7. A CVT as recited in claim 6, wherein the CVT further comprises a thermostatic valve provided between the send arm and the radiator, the thermostatic valve being so configured as to return the fluid to the return arm when the temperature of the lubricating fluid is below a predetermined threshold.

8. A rotation blocker/pump assembly to be used in a CVT to both prevent rotation of a non-rotating sleeve by connecting the sleeve to a casing of the CVT and to pump fluid present in the casing, the CVT including a hollow shaft rotatable within the non-rotating sleeve, the assembly comprising:
a central hub mounted to the non-rotating sleeve;
an intake arm, a send arm and a return arm each having a first end mounted to the casing and a second end mounted to the central hub; the send arm being fluidly connectable to the return arm, the return arm being fluidly connected to the hollow shaft; and
a gerotor pump associated with the central hub, the gerotor pump having an intake associated with the intake arm and an outlet associated with the send arm; the gerotor pump having an inner rotor mounted to the shaft and an outer rotor meshed with the inner rotor;
whereby a) rotation of the shaft causes rotation of the inner and outer rotors of the gerotor pump to thereby cause a pumping action between the intake and outlet of the gerotor pump and b) rotation of the non-rotating sleeve is prevented by the interconnection of the sleeve to the casing through the rotation blocker/pump assembly.

9. A rotation blocker/pump assembly as recited in claim 8, wherein the second ends of the intake arm, the send arm and the return arm are integral with the central hub.

10. A rotation blocker/pump assembly as recited in claim 8, wherein the second ends are provided with apertures and where the casing is provided with brackets also provided with corresponding apertures allowing fasteners to be used to secure the arms to the casing.

* * * * *